April 1, 1930.                F. A. HUBBARD                1,752,528
METHOD AND APPARATUS FOR COMPARING AND ADJUSTING THE ELECTRICAL
   LENGTH OF PATHS FOR THE TRANSMISSION OF ELECTRICAL ENERGY
                      Filed Sept. 4, 1919
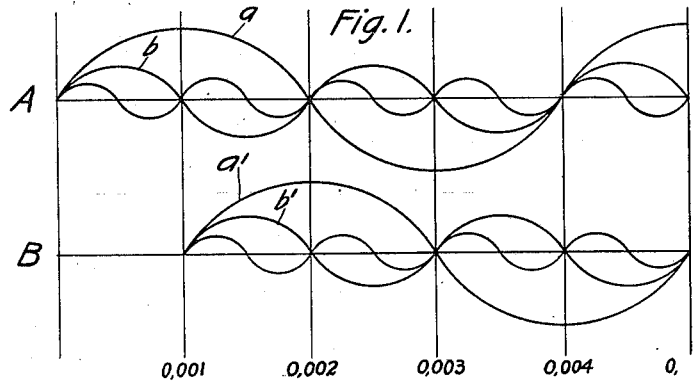
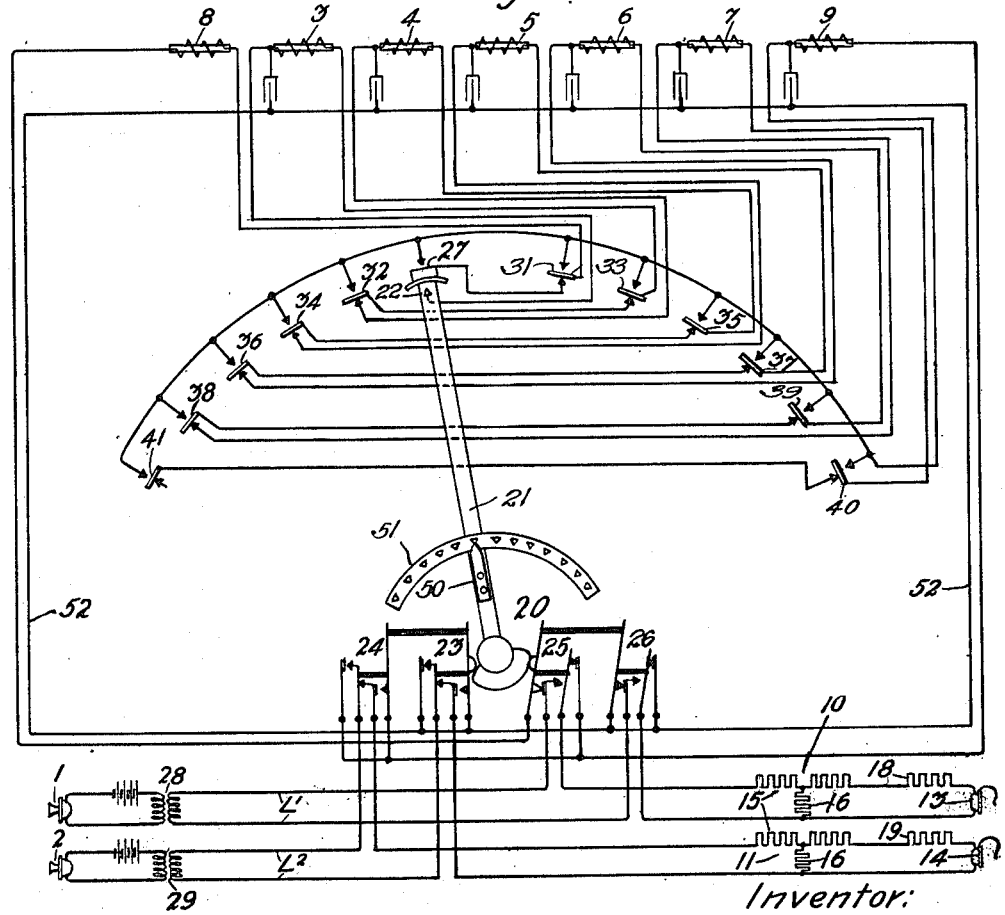
Inventor:
Francis A. Hubbard.
by J. H. Roberts
                Att'y.

Patented Apr. 1, 1930

1,752,528

UNITED STATES PATENT OFFICE

FRANCIS ALLEY HUBBARD, OF TEANECK, NEW JERSEY, ASSIGNOR TO WESTERN ELECTRIC COMPANY, INCORPORATED, OF NEW YORK, N. Y., A CORPORATION OF NEW YORK

METHOD AND APPARATUS FOR COMPARING AND ADJUSTING THE ELECTRICAL LENGTH OF PATHS FOR THE TRANSMISSION OF ELECTRICAL ENERGY

Application filed September 4, 1919. Serial No. 321,512.

The invention relates to a method and apparatus for comparing and adjusting the electrical length of paths for the transmission of electrical energy. While the method and apparatus of the invention may be used for a variety of purposes, it will probably find its most important application in connection with the so-called binaural method of determining the location of a source of sound, and in connection with other similar methods of locating a distant source of sound.

It has heretofore been proposed to make use of physiological phenomena by virtue of which an individual is enabled to determine the direction of a source of sound by the more or less unconscious comparison of the effects of such sound upon his two ears. It has been demonstrated that a source of sound placed immediately in front of an observer produces a sense of balance, due to the simultaneous arrival at the two ears of identical sound stimuli. This is known as a "binaural balance." When this sense of balance exists, however, it is produced, the deduction of the observer is unconsciously that the source of sound is directly in front of him. In existing methods for determining the direction of a source of sound based on this physiological fact, it has been proposed to use a pair of spaced acoustic devices which are used in connection with means which will acoustically or electrically conduct the effect of the sound to the opposite ears of an observer. By rotating these acoustic devices the same effect is obtained as would be obtained if the observer turned bodily to face the sound. The same effect can be obtained, as has been demonstrated by experiment, by holding the acoustic devices on a fixed base line and altering the relative effective lengths of path for the sound or some effect thereof, until it reaches the observer's ears at the same time. One way to do this is to vary the length of the tubes connecting the acoustic devices with the observer's ears, and, by noting the necessary variation, to determine the amount of rotation which would have been necessary to shift the acoustic devices so that a line connecting the acoustic devices would be normal to the direction of the source of sound under consideration.

It has also been proposed to replace the acoustic devices by an electrical system comprising detecting devices for transforming the sound waves or vibrations into periodic variations in the system, and translating devices similar to an ordinary telephone receiver, by means of which these variations may be retranslated into audible effects, which may be conducted to the ears of the observer. As far as the applicant is aware, in systems of this sort the electrical paths from the receivers have been maintained constant and the acoustic paths from the receiving instruments to the ears have been altered for the purpose of obtaining a balance. The method and apparatus of this invention, however, provide for eliminating the acoustical adjustment by adjusting the length of the electrical paths between the detecting and the translating devices for the purpose of obtaining a binaural balance.

It is obvious that if, in such an electrical system as has been described, two sound responsive devices, such as a pair of microphones, are located a given distance apart and are acted upon by the same source of sound which is located in a direction perpendicular to a line joining the microphones, and the electrical paths between the sound responsive devices and the translating devices are exactly alike, a binaural balance will be obtained, indicating to the observer that the source of sound is located on a line perpendicular to a line connecting said microphones. If, however, this condition does not obtain, the sound responsive devices or microphones will be differently affected. For example, consider any given sound impulse propagated from a source located at an angle to the base line joining two sound-responsive devices. It will reach one sound-responsive device in advance of the other. This will cause a phase difference between the electrical impulses generated in one circuit and the similar impulses generated in the other circuit. This effect can probably be best explained by reference to Fig. 1, in which the abscissæ of the curves represent time, and the ordinates instantaneous values of current. The curves on axes A and B show the relative magnitudes of the electrical impulses set up in two sound-responsive devices by a sound wave which reaches A an interval of 0.001 second before it reaches B. Suppose the sound vibration is a pure tone whose frequency is 250 cycles per second, setting up a current of the form of curve $a$, $a^1$ in Fig. 1. It will be seen that the time interval of 0.001 second, already referred to, causes the current in circuit B to lag behind that in circuit A by one-quarter wave length, or 90°. If now, by some change in electrical constants, the current in circuit A is retarded by 90°, the currents in the two receivers will be in phase, and the observer will have a sense of binaural balance. If these curves so far discussed represented the conditions met with in practice, it might be a comparatively simple matter to adjust the electrical constants of the circuits so that the leading wave would be retarded relatively to the other wave, or in other words, it might be possible to obtain simple electrical compensation for the difference in time interval of the receipt of the two waves.

However, in practice, the sound which it is desired to locate is rarely a pure tone, but is a tone made up of a fundamental and several harmonics. This complicates the problem and renders a simple adjustment of the electrical constants of the circuits in question practically valueless. If we assume, for instance, that the sound wave includes not only the pure tone represented by $a$ and $a^1$, but also a harmonic $b$ and $b^1$, which is twice the frequency of the fundamental, it is obvious that a correct balance will not be obtained by shifting the phase of the fundamental 90° unless the harmonic is shifted an amount equivalent to 180°. Similarly, another harmonic $c$ and $c^1$ of four times the frequency of the fundamental, would require a shift of 360° in order to obtain a balance. In other words, each component of a complex wave must be retarded by an angle proportional to its frequency.

Since, as pointed out above, a haphazard adjustment of one or more of the electrical constants of the two circuits will not meet the conditions required for a balance, in accordance with a feature of the invention the length of electrical path for an electrical wave transmitted over such path is adjusted by effecting a phase shift of the components of such wave proportional to the frequencies of such components. Therefore, in accordance with this feature of the invention, means is provided in the electrical path for the transmission of the wave to affect each of the components of the electrical wave proportional to the frequencies of such component. In accordance with this feature of the invention advantage is taken of the demonstrable fact that the components of an electrical wave propagated along a so-called distortionless line of infinite length are retarded, or in other words, the phase thereof is shifted, proportionally to the frequency of such components. It can also be demonstrated that by varying the electrical constants of such a line the amount of phase shift can be correspondingly varied. In the embodiment of the invention hereinafter disclosed, such a line is provided by means of an artificial line which simulates a section of a distortionless line of infinite length. This simulated line may take the form of a loaded line comprising a plurality of sections containing series inductance and shunt capacity with a minimum series resistance and shunt conductance, in which the effective sections may be varied, and which terminates in approximately a pure resistance. These and other features of the invention not specifically mentioned above will more clearly appear from the following specification in connection with the drawing, in which Fig. 1, as before mentioned, is a diagrammatic representation showing the phase relation of a theoretical wave form which may be transmitted over electrical paths which it is desired to adjust or compare; and Fig. 2 is a circuit drawing showing diagrammatically an adjustable electrical path constructed in accordance with one embodiment of the invention.

It is well known that an electrical oscillation or wave in traversing a transmission line is affected by such line; that is, there is a certain amount of attenuation imposed on the wave and there is a retarding effect upon such wave. It has been proven that this effect involves not merely a loss of amplitude in the wave, but a shift in the phase. The effect may conveniently be expressed mathematically by the use of a constant which is referred to in the art as the "propagation" constant. For a line of infinite length this propagation constant may be expressed as follows:

$$(1) \quad \frac{I_2}{I_1} = \epsilon - L\alpha$$

where $I_1$ represents the current at any point on the line; $I_2$ the current at a distance L beyond such point; $\epsilon$ the base of the natural system of logarithms; and $\alpha$ the propagation constant. The propagation constant is in general complex and may be expressed by the following equation:

$$(2) \quad \alpha = a + jb$$

in which, $a$ represents the loss in volume or amplitude, and $b$ represents the phase shift per unit length. For a transmission line it has been demonstrated that $\alpha$ may be represented in the terms of the electrical constants of the line, as in the following equation:

$$(3) \quad \alpha = \sqrt{(r+jlw)(g+jcw)}$$

wherein, $r$ equals the series resistance
$l$ equals the series inductance
$g$ equals the shunt conductance
$c$ equals the shunt capacity
$j$ equals the complex operator $\sqrt{-1}$ per unit length of line and $w = 2\pi f$ where $f$ is the frequency. If the constants $r$, $l$, $g$ and $c$ are chosen so that $$(4) \quad \frac{r}{l} = \frac{g}{c}$$

it follows that $g$ equals $Kr$, and $c$ equals $Kl$ where K is a constant. Then from Equation (4) it follows that $$(5) \quad g + jcw = K(r + jlw)$$

Substituting this value in Equation (3) we arrive at the following expression:

$$(6) \quad \alpha = \sqrt{K(r+jlw)^2} = \sqrt{K}(r+jlw)$$

Analyzing this expression (6) into its components we have $$(7) \quad \alpha = a + jb = \sqrt{K}(r+jlw)$$

From this expression, (7), it follows that for a given length of a line satisfying the conditions expressed in Equation (4), the loss in volume $a$ is independent of the frequency, and that the phase shift $b$ is proportional to the frequency. In a line satisfying these conditions the wave is not distorted and consequently such a line may be called a distortionless line.

While in practice it is possible to construct an artificial line with whatever values of $r$, $g$, $l$ and $c$ may be desired, it is of course impossible to provide a line of infinite length, but such a line can be simulated with a sufficient degree of accuracy for all practical purposes.

It is well known also that a transmission line of finite length behaves like a section of a line of infinite length, provided the impedance to which such finite line is connected is equal at all frequencies to what is known in the art as the "surge impedance" of the infinite line. It is not thought necessary or desirable to introduce in this application a discussion of the physical principles underlying this statement, since they have been discussed in various publications well known in the art, such for example as J. A. Fleming's "The Propagation of Electric Currents in Telephone and Telegraph Conductors", 1919, pages 78 to 82 and A. E. Kennelly's "The Application of Hyperbolic Functions to Electrical Engineering Problems" 1912, pages 69 to 70. It is thought sufficient for the present purpose to note that for a transmission line this terminal or surge impedance may be represented by the following equation:

$$(8) \quad Z_o = \sqrt{\frac{r+jlw}{g+jcw}}$$

For a distortionless line since $$(5) \quad g + jcw = K(r+jlw)$$

$$(9) \quad Z_o = \sqrt{\frac{r+jlw}{K(r+jlw)}} = \sqrt{\frac{l}{K}}$$

It will be noted that for a distortionless line $Z_o$ is a constant, real quantity independent of frequency; in other words, it is a pure resistance. Therefore, a section of a distortionless line of infinite length behaves like an artificial line which terminates in a pure resistance of the proper valve, and such an artificial line will retard the phase of each component of wave propagated over it by an angle proportional to the frequency of such component and to the length of the artificial line. The amount of this retardation may be varied by varying the length of the line or its constants; but provided the relation (4) is always maintained, the retardation will always be proportional to the frequency of the wave or component considered. In other words, such a line provides an adjustable electrical path of the desired characteristics.

In order to compare the lengths of two electrical paths over which are transmitted the same wave form, obviously it is necessary to utilize an indicating device which may take the form of a device for translating the electrical wave into an audible effect or effects by means of which the comparison may be made by an observer. Inasmuch as the ordinary telephone receiver includes an inductive winding, if it is connected without some special arrangement for compensating for such inductance, the terminating impedance of the artificial lines will no longer be a pure resistance. There is, however, one form of translating instrument which may be used which has only a pure resistance, and that is the so-called "thermo" telephone. Since, however, the thermo telephone has not been developed to the extent of the ordinary telephone instrument, it is desirable for practical purposes to provide some means whereby the ordinary telephone may be used, and in accordance with another feature of this invention, a special section is provided in connection with the artificial lines to permit the connection of an ordinary telephone with such artificial lines without seriously disturbing the phase-shifting function of such lines.

In the specific embodiment of the invention shown in Fig. 2, two lines are indicated at $L^1$ and $L^2$. Inasmuch as these lines are to be used in connection with the binaural method of sound detection, there is associated with line $L^1$ a microphonic detector indicated at 1 and a similar detector indicated at 2 associated with line $L^2$. These detectors are secured a fixed distance apart and are stationarily mounted in such position. The distance the detectors are separated is determined by the accuracy which is sought, by the physical limitations of the structure on which the detectors are mounted. The possibility of multiple balance points is practically eliminated by the presence of numerous frequencies since only a wave and its integral harmonics could have false balances at the same point. Arranged to be associated with either of the lines $L^1$ and $L^2$, as will hereinafter more clearly appear, are a plurality of sections of an artificial line 3, 4, 5, 6 and 7, and two half sections 8 and 9, each of which sections as shown consists of a series inductance and a shunt capacity. The values of inductance and capacity to be used are determined by the amount of phase shift desired per section, and the "surge impedance" for which the line is designed. The series resistance associated with the inductance coils is made as small as possible. To maintain strictly the relation expressed in Equation (4), it would be necessary to provide a high resistance shunted around each condenser. It can be demonstrated, however, both mathematically and experimentally, that for the range of frequencies of interest no appreciable error will be introduced by omitting this shunt resistance altogether; and this is ordinarily done in practice. Consider an artificial line such as covered by Equations 2 and 3 on page 7, except that "$g$" for this line has a zero value; the value of "$b$" for this later line, which we will call $b'$, may be compared with the "$b$" of the original distortionless line in the following manner. By expanding and combining the members of Equation 3 and equating real and imaginary components, the following is obtained.

$$b = \sqrt{\tfrac{1}{2}\{\sqrt{(r^2+l^2w^2)(g^2+c^2w^2)}-(gr-lcw^2)\}} \quad (10)$$

For the line under consideration "$g$" equals zero and "$c$" equals $Kl$. Equation 10, therefore, becomes for this line:

$$b' = \sqrt{\tfrac{1}{2}\{\sqrt{(r^2+l^2w^2)K^2l^2w^2}+Kl^2w^2\}} \quad (11)$$

If we let $\rho = \frac{r}{lw}$, Equation (11) reduces to $$b' = lw\sqrt{k}\sqrt{\tfrac{1}{2}(1+\sqrt{(1+\rho^2)})} \quad (12)$$

From line 12, page 8, we know that for the original distortionless line $$b = lw\sqrt{K} \quad (13)$$

Therefore $$\frac{b'}{b} = \sqrt{\tfrac{1}{2}(1+\sqrt{1+\rho^2})} \quad (14)$$

This gives the ratio by which the phase shift of a line without shunt leakage varies from that of a true distortionless. For an ordinary commercial loading coil, $\frac{r}{l} = 100$ is a fair value. Under these conditions, at 200 cycles, the lowest frequency which generally need be considered, $$\rho = 0.08 \frac{b'}{b} = 1.0016$$

For higher frequencies the ratio would be correspondingly closer to 1. In a small, light coil, such as might be used if it were desired to build a compact piece of apparatus, $\frac{r}{l} = 500$ is a reasonable value. In this case, at 200 cycles $$\rho = 0.4 \frac{b'}{b} = 1.019$$

So it appears therefore that even for such a relatively inefficient coil as has been assumed, the maximum error involved is less than 2%; and at the higher frequencies, at which the bulk of the energy of most sounds is located, the error becomes entirely negligible. There are also associated with the transmission lines $L^1$ and $L^2$ so-called protective sections 10 and 11. While these sections are shown at the terminating end of the lines $L^1$ and $L^2$, that is, adjacent to the translating instruments, which may be ordinary telephone receivers 13 and 14, it can be demonstrated by experiment that the same effect can be obtained as far as simulating a distortionless line of infinite length is concerned if such protective sections are connected in at any other point in the lines. It will be observed that these protective sections 10 and 11 include a series resistance 15 and a shunt resistance 16, and there are also included in series with the receivers 13 and 14 resistances 18 and 19, so that the preponderating part of the terminating section is a pure resistance. In actual practice, these resistances are chosen so that the reactance introduced by the receiver winding at frequencies of interest is in effect reduced to a small value as far as the surge impedance represented by the terminating section is concerned.

In order to adjust the length of the lines described, there is provided a switch which is indicated as a whole at 20. This switch includes an operating lever or arm 21 which carries at its upper end a contact operating member 22 and is arranged at its lower end to operate when thrown to the right, the switches indicated diagrammatically at 23 and 24; and when thrown to the left, similar switches 25 and 26. With the switch in normal position, the two transmission lines $L^1$ and $L^2$ are exactly equivalent. This condition is obtained by omitting from both lines all of the sections 3 to 9 inclusive, and by utilizing matched detectors 1 and 2 which have impedance, and also utilizing matched receivers 13 and 14 and protective sections 10 and 11 of identical construction and impedance. Under these conditions the two conductors forming line $L^1$ may be traced from the secondary of the repeating coil 28 through the normal contacts of switches 25 and 26 to the protecting network 10 and the receiver 13; whereas the conductors of line $L^2$ may be traced from the secondary winding of the repeating coil 29 through the normal contact of switches 23 and 24 to the protecting network 11 and receiver 14. Under these conditions, if the detectors are affected simultaneously by sound waves, a binaural balance will be obtained in the receivers 13 and 14, since the paths represented by the lines $L^1$ and $L^2$ are of equal electrical length. If, however, these effects are not received simultaneously by the detectors, it will be necessary, in order to obtain a binaural balance, to operate the switch 20 to bring about an adjustment of the relative electrical lengths of the two paths.

Assuming for example that the switch arm 21 is in the position shown in Fig. 2 in which it is moved one step to the left so as to actuate the contact 27, the following circuit conditions are established. With respect to the line $L^1$ a circuit is established from the secondary winding of the repeating coil 28 through the left-hand alternate contact of the switch 25, the series inductance of the first half section 8, contact 31, the operated contact 27, the series inductance of the half section 9, the right-hand alternate contact of switch 25, the series resistance of the network 10, the resistance 18, receiver 13, the right-hand alternate contact of the switch 26, conductor 52 of the artificial line, the left-hand alternate contact of switch 26, to the other side of the secondary of repeating coil 28. The line $L^2$ will be unchanged. Therefore, in the line $L^1$ there will be included two half sections of the artificial line and no part of the artificial line will be included in the line $L^2$. Under these conditions it is obvious that the electrical length of the line $L^1$ is greater than the electrical length of the line $L^2$. Assume now that the arm 21 is thrown to the extreme left position to operate the contact 41. Under these conditions the following circuit is established; from the secondary of repeating coil 28, the left-hand alternate contact of switch 25, the inductance of half section 8, contacts 31 and 27, the inductance of section 3, contacts 33 and 32, the inductance of section 4, contacts 35 and 34, the inductance of section 5, contacts 37 and 36, the inductance of section 6, contacts 39 and 38, the inductance of section 7, contact 40, the operated contact 41, the inductance of half section 9, the right-hand alternate contact of switch 25, the protective section 10, resistance 18, receiver 13, the right-hand alternate contact of switch 26, conductor 52 of the artificial line, the left-hand alternate contact of switch 26, to the secondary of repeating coil 28. Under these conditions the sections 3, 4, 5, 6 and 7 and the two half sections 8 and 9 of the artificial line are included in the line $L^1$. The line $L^2$ is unchanged. If the switch is thrown in the other direction, that is, to the right, because of the actuation of switches 23 and 24 and the non-actuation of switches 25 and 26, a variable number of the artificial line sections will be included in the line $L^2$, depending upon the particular contact actuated by the switch arm, and no sections of the artificial line will be included in the line $L^1$. Inasmuch as the connection of a section of the artificial line with either of the lines $L^1$ or $L^2$ operates to retard or shift the phase of the wave propagated along such line, it is possible to calibrate the apparatus so that the position of the arm 21 will indicate a definite angle of phase shift. The angle of phase shift indicated by the position of the arm 21 when adjusted to obtain a binaural balance in the receivers 13 and 14 may, by suitable calibration, serve to indicate directly the direction of the source of sound which affects the directors 1 and 2. For example, a pointer 50 carried by or moved with the arm 21 may move over a scale 51, which scale may be calibrated to read in degrees displacement from the base line joining the detectors and consequently serve to indicate directly the bearing of the source of sound from the base line.

While the switching arrangement just described is the best form of which the applicant is aware, it is obvious that a variety of switching arrangements may be devised which will vary the number of sections of the artificial line included in either the lines $L^1$ or $L^2$. It is obvious that any form of detecting device may be used and that any form of translating device may be used instead of the receivers 13 and 14 without departing from the spirit of the invention.

The adjustable electrical path, according to the invention, while it has been described in connection with perhaps its most important application in connection with the binaural method of locating sources of sound, may be used for a variety of other purposes. For example, it may be used to determine the characteristics of a pair of detectors which are simultaneously affected by the same mechanical disturbances. If the detectors are exactly equivalent and produce equivalent waves in the lines L¹ and L², a balance will obviously be obtained when the arm 20 is in its neutral position. Any departure from equality of the detectors will be indicated by the adjustment of the arm 20 which is necessary to obtain a balance. The adjustable electrical path of the invention may also be used in cases where it is desired to produce the simultaneous arrival at a given point of a signal transmitted between two media, one of which includes the adjustable path. Under these conditions the signal transmitted over the adjustable path may be retarded by adjustment of such path until the signal is propagated over the adjustable path during the same interval of time that is required to transmit it through some other media, such, for example, as through the air. Various other applications of the electrical adjustment will probably suggest itself to others skilled in the art.

What is claimed is:

1. A method of locating the direction of a source of sound, which consists in measuring the time interval between the response of two similar sound responsive current-varying devices by relatively varying the electrical length of a pair of electrical circuits including said devices to shift the phase of the waves generated in such circuits until the waves are in phase coincidence, whereby the direction of the source of sound may be deduced from the variation of the electrical paths.

2. Apparatus for locating the direction of a source of sound, comprising a pair of sound responsive current varying devices, a pair of transmission lines including such devices, a pair of translating instruments, means for retarding an electrical wave generated in one of said circuits by its associated sound responsive device until the translating instruments are simultaneously affected, and means, the position of which is determined by the adjustment of said compensating means, to indicate the direction of the source of sound.

3. Apparatus for locating the direction of a source of sound, comprising a pair of sound responsive current varying devices and a pair of translating devices connected by a pair of transmission lines, means to adjust the electrical length of one of said transmission lines to compensate for differences in time of arrival of a sound wave at said sound responsive devices, and means associated with said compensating means for indicating the direction of the source of sound.

4. Apparatus for locating the direction of a source of sound, comprising a pair of sound responsive current varying devices, a pair of transmission lines including such devices, a pair of translating devices associated with said lines, means for electrically compensating for difference in time of response of such responsive devices to cause the equivalent response of said translating devices, and means associated with the electrical compensating means to indicate the direction of the source of sound.

In witness whereof, I hereunto subscribe my name this 16th day of June, A. D. 1919.

FRANCIS ALLEY HUBBARD.